(12) United States Patent
St. Pierre (10) Patent No.: US 7,987,255 B2
(45) Date of Patent: Jul. 26, 2011

(54) DISTRIBUTED DENIAL OF SERVICE CONGESTION RECOVERY USING SPLIT HORIZON DNS

(75) Inventor: Robert Paul St. Pierre, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 273 days.

(21) Appl. No.: 12/267,475

(22) Filed: Nov. 7, 2008

(65) Prior Publication Data

US 2010/0121979 A1    May 13, 2010

(51) Int. Cl.
*G06F 15/173* (2006.01)
*G06F 15/16* (2006.01)

(52) U.S. Cl. ......... 709/223; 709/224; 709/225; 709/235

(58) Field of Classification Search .................. 709/223, 709/224, 225, 235
See application file for complete search history.

(56) References Cited

U.S. PATENT DOCUMENTS

| | | | |
|---|---|---|---|
| 7,089,428 B2 * | 8/2006 | Farley et al. | 726/22 |
| 7,484,097 B2 * | 1/2009 | Steiger et al. | 713/176 |
| 7,681,235 B2 * | 3/2010 | Chesla et al. | 726/23 |
| 2002/0035698 A1 * | 3/2002 | Malan et al. | 713/201 |
| 2003/0028671 A1 * | 2/2003 | Mehta et al. | 709/245 |
| 2004/0193943 A1 * | 9/2004 | Angelino et al. | 714/4 |
| 2006/0069912 A1 * | 3/2006 | Zheng et al. | 713/151 |
| 2007/0033645 A1 * | 2/2007 | Jones | 726/12 |
| 2007/0121596 A1 * | 5/2007 | Kurapati et al. | 370/356 |
| 2008/0031235 A1 * | 2/2008 | Harris et al. | 370/389 |
| 2008/0052774 A1 * | 2/2008 | Chesla et al. | 726/13 |
| 2008/0262991 A1 * | 10/2008 | Kapoor et al. | 706/20 |

* cited by examiner

*Primary Examiner* — Kristie D Shingles
(74) *Attorney, Agent, or Firm* — Osha • Liang LLP (57) ABSTRACT

A method for congestion recovery during a denial of service attack involves creating a split horizon zone on a server, where the split horizon zone includes a fictitious zone mapped to a fictitious address, receiving and investigating requests from clients, designating a malicious client based on investigating the requests, where the malicious client is associated with a client address, assigning the client address to the fictitious zone, and routing network traffic from the malicious client to the fictitious address.

18 Claims, 6 Drawing Sheets

DISTRIBUTED DENIAL OF SERVICE CONGESTION RECOVERY USING SPLIT HORIZON DNS

BACKGROUND

Distributed denial of service (DDOS) attacks occur when a malicious user seeks to stop or severely limit access to a website. To achieve such results, the malicious user may attack the website in a variety of ways, such as attempting to overwhelm the servers of the website by bombarding it with requests.

Typically, to access a website, a user types in the name of the website in a web browser. However, that name is not the internet address of the website, but rather is a textual name that refers to a server or a set of servers. All textual names are resolved by a Domain Name System (DNS) server. A DNS server resolves a textual name to one or more physical Internet Protocol (IP) addresses. In IP version 4, typical IP address are 32 bit numbers and are represented as a series of 8-bit numbers separated by periods such as 192.168.0.0. In IP version 6, addresses are 128 bit numbers and are represented as colon separated hex digits. DNS servers can use a split horizon DNS, which is a method for providing different IP addresses for different users, based on the users originating IP address. Using split horizon DNS, it is possible to keep private networks private while still providing web services to the general population.

SUMMARY

In general, in one aspect, the invention relates to a method for congestion recovery during a denial of service attack. The method involves creating a split horizon zone on a server, wherein the split horizon zone comprises a fictitious zone mapped to a fictitious address, receiving and investigating a plurality of requests from a plurality of clients, designating a malicious client from the plurality of clients based on investigating the plurality of requests, wherein the malicious client is associated with a client address, assigning the client address to the fictitious zone, and routing network traffic from the malicious client to the fictitious address.

In general, in one aspect, the invention relates to a system for denial of service attack congestion recovery. The system includes a plurality of clients with a processor comprising functionality to execute software instructions for sending a plurality of requests, wherein the plurality of requests comprise requests for a plurality of Internet Protocol (IP) addresses, a domain name system (DNS) server communicatively coupled to the plurality of clients and configured for: creating a split horizon zone, wherein the split horizon zone comprises a fictitious zone mapped to a fictitious address, receiving and investigating a plurality of requests from the plurality of clients, designating a malicious client from the plurality of clients based on investigating the plurality of requests, wherein the malicious client is associated with a client address, assigning the client address to the fictitious zone, routing network traffic from the malicious client to the fictitious address, and an intrusion detection system (IDS) communicatively coupled to the plurality of clients and the DNS server.

In general, in one aspect, the inventions relates to a computer readable medium storing instructions for congestion recovery during a denial of service attack. The instructions comprise functionality to create a split horizon zone on a server, wherein the split horizon zone comprises a fictitious zone mapped to a fictitious address, receive and investigate a plurality of requests from a plurality of clients, designate a malicious client from the plurality of clients based on investigating the plurality of requests, assign the address of the malicious client to the fictitious zone, and route network traffic from the malicious client to the fictitious address.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for congestion recovery during a DDOS attack using split horizon DNS. Specifically, in one or more embodiments of the invention, after a client has been determined to be malicious, the malicious client is assigned to a fictitious split horizon zone which maps host addresses to fictitious locations. Therefore, when the malicious client requests the internet protocol (IP) address of a host, the client is sent a fictitious IP address. A client may be deemed malicious by an intrusion detection system (IDS), which monitors incoming requests. Examples of actions that may be deemed malicious include, but are not limited to, too many requests, illegal requests, hacking, and other malicious activities. In one or more embodiments of the invention, a malicious client may be identified by IP address. It will be apparent to one of ordinary skill in the art that the fictitious split horizon zone may send malicious users to any website that is not on the same network as the server, and still be within the scope of the invention.

Figure 1:
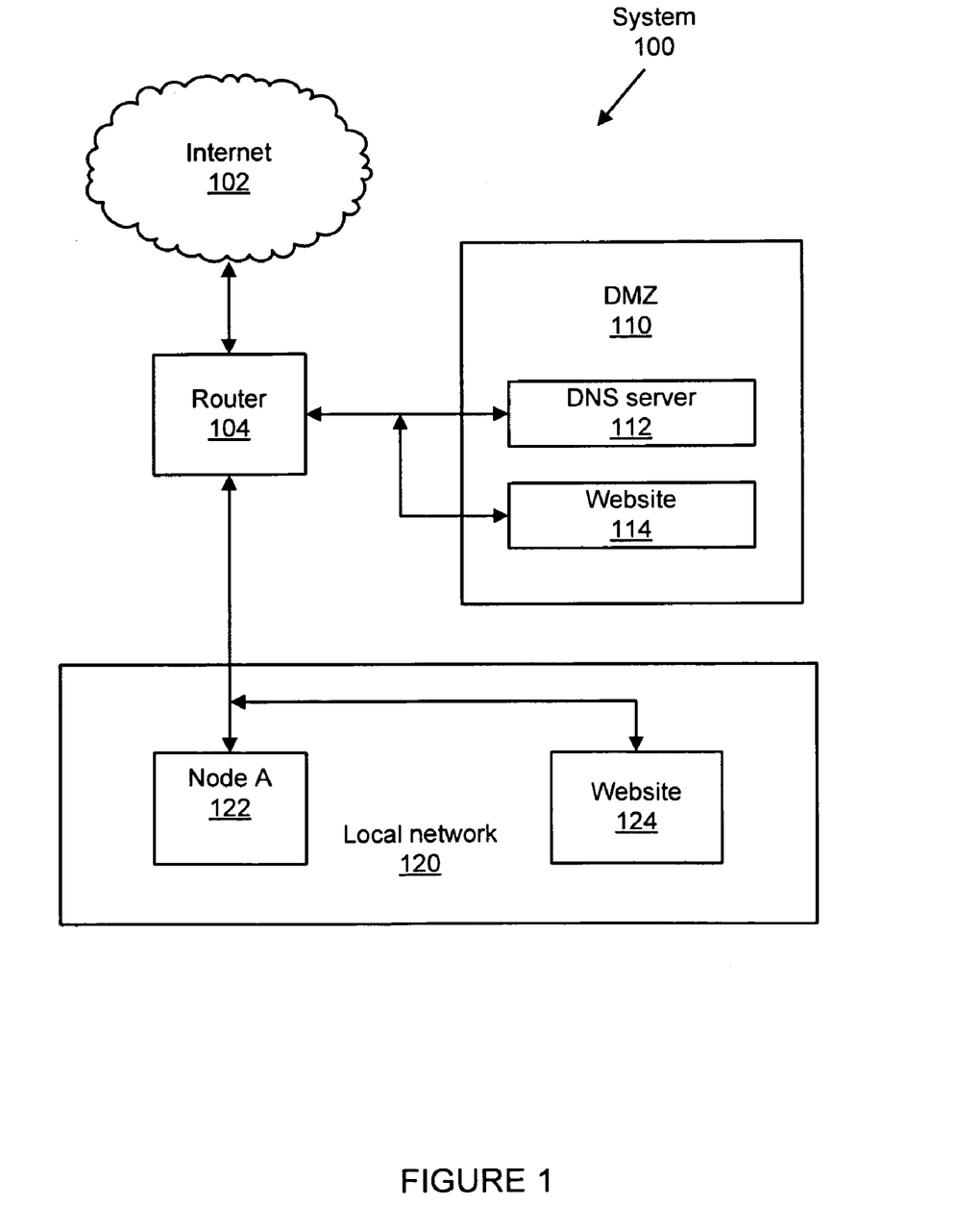
FIG. 1 shows a dataflow diagram of a system in accordance with one or more embodiments of the invention.

FIG. 1 shows a dataflow diagram of a system setup to support split horizon DNS, in accordance with one or more embodiments of the invention. In one or more embodiments of the invention, the system (100) contains the Internet (102), a router (104), a demarcation zone (DMZ) (110) which includes a DNS server (112) and a website (114), and a local network (120) which includes node A (122) and a website (124). Each of the aforementioned components of FIG. 1 is discussed below.

In one or more embodiments of the invention, the Internet (102) is the network through which outside clients connect to the services located behind the router (104). Clients (not shown) may use wired and/or wireless connections to access the Internet (102). Clients (not shown) may send requests, such as a request for an IP address of a host, through the Internet (102) to machines located behind the router (104). In one or more embodiments of the invention, the router (104) controls and directs network traffic into, and out of, the network behind the router (104).

In one or more embodiments of the invention, clients outside the local network (120) (i.e., clients connecting to the network through the Internet) are directed to the DMZ (110) by the router (104). The purpose of the DMZ (110) is to expose the services of the local network (120) to a larger, untrusted network (e.g., the Internet), and to provide security while providing access to the services of the local network (120). The DMZ (110) may include one or more DNS server (s) (112), a website (114), simple mail transfer protocol (SMTP) servers (not shown), and other services intended to be accessed by clients located outside the local network (120).

In one or more embodiments of the invention, the DNS server (112) is configured to support split horizon DNS. In other words, the DNS server (112) includes functionality to respond to client requests for host addresses with different IP addresses for the same services based on where the request originated from. For example, a client requesting the IP address of the website (114) and accessing the DNS server (112) from the Internet (102) may be directed to the website (114) located in the DMZ (110). However, a client requesting the IP address of the website (124) and accessing the DNS server (112) from the local network (120) may be directed to the website (124) located on the local network (120). The DNS server (112) is discussed below in conjunction with FIG. 2. In one or more embodiments of the invention, the website (114) and the website (124) may be substantially the same website. The difference may simply be that clients accessing the DNS server (112) outside the local network (120) are not permitted to access the website (124) for security purposes.

In one or more embodiments of the invention, the local network (120) is a company-wide network (i.e., an Intranet), or any other kind of private network. Node A (122) may be any network device located on the local network (120), such as a computer, printer, fax, copier, smart phone, or any other network device. The website (124) may be substantially the same as the website (114), as discussed above. Those skilled in the art will appreciate that neither node A (122) nor the website (124) may be accessed by any clients connecting to the DNS server (112) using the Internet (102).

Figure 2:
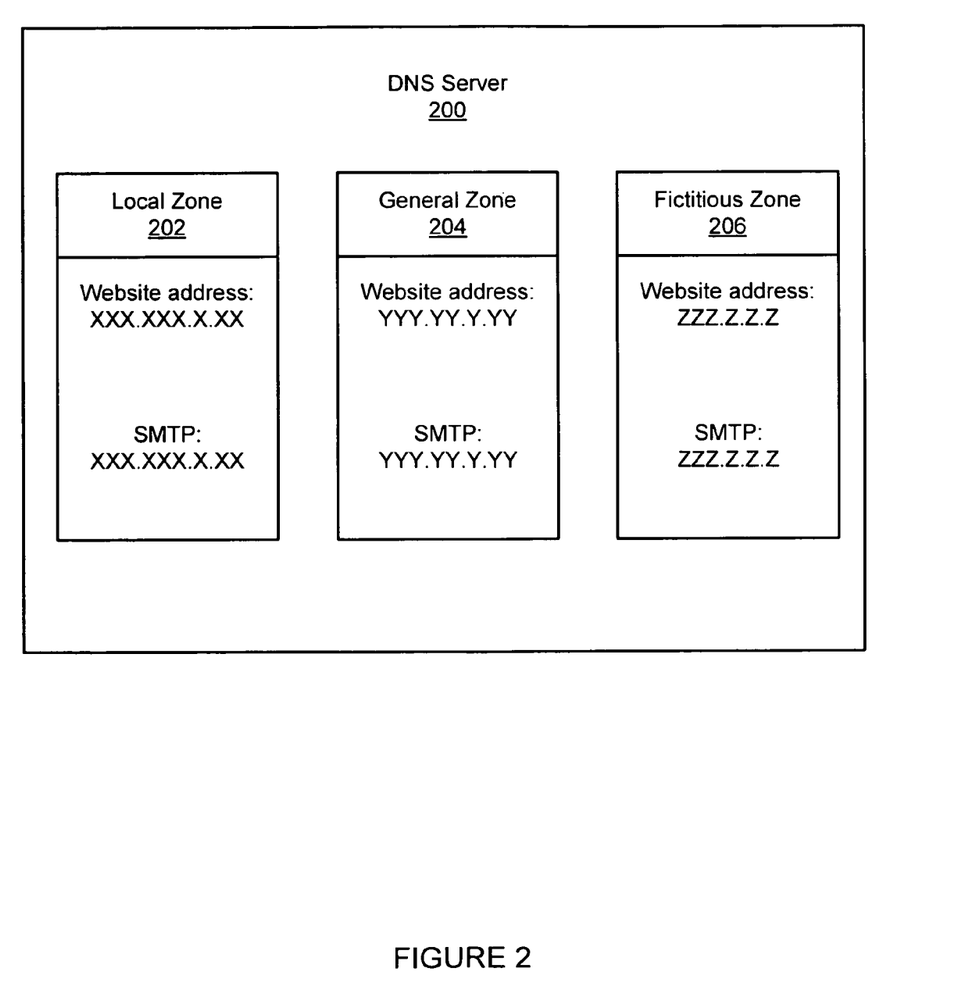
FIG. 2 shows a diagram of a component of a system in accordance with one or more embodiments of the invention.

In one or more embodiments of the invention, FIG. 2 shows a diagram of a DNS server (200), such as the DNS server (112) of FIG. 1, in detail. Specifically, the DNS server (200) in FIG. 2 is configured to support split horizon zones. In one or more embodiments of the invention, the split horizon zones may be created in advance of an attack. Alternatively, the zones may be dynamically created and/or altered during an attack. In one or more embodiments of the invention, the DNS server (200) includes the following zones: a local zone (202), a general zone (204), and a fictitious zone (206). It will be apparent to one of ordinary skill in the art that the number of zones is not limited to three zones as shown in FIG. 2; rather, as many or as few zones as are desired may be created. All the zones (e.g., a local zone (202), a general zone (204), and a fictitious zone (206)) contain mappings of hosts to IP addresses. Clients accessing the DNS server (200) to request an IP address of a particular service may be assigned to zones based on the client's IP address. For example, in one or more embodiments of the invention, clients connected to the local network on which DNS server (200) exists may be assigned to the local zone (202), non-malicious clients from the Internet may be assigned to the general zone (204), and malicious clients from the Internet may be assigned to the fictitious zone (206). Thus, a local client receives an address of "XXX.XXX.X.XX" when requesting the website IP address, a general non-malicious client receives an address of "YYY.YY.Y.YY" when requesting the website IP address, and a malicious client receives an address of "ZZZ.Z.Z.Z" when requesting the website IP address.

In one or more embodiments of the invention, the IP addresses of the fictitious zone (206) may or may not be actual IP addresses. For example, the website address may be set to the address of the malicious client, thereby sending the malicious client to itself. Alternatively, the IP address may be set to the address of a different malicious client or to a non-routable address. It will be apparent to one of ordinary skill in the art that, within the scope of the invention, the fictitious zone may direct a malicious client to any IP address that is not within the local network.

Also, the fictitious zone is not limited to website addresses. The fictitious zone may direct malicious clients to fictitious locations for any service that a DNS server can provide addresses for (e.g., SMTP, file transfer protocol (FTP), and/or any other suitable services). For example, if a malicious client uses an e-mail based attack (i.e., SMTP), the fictitious zone may give the malicious client an incorrect address for the e-mail server. In FIG. 2, the local zone (202) for SMTP returns "XXX.XXX.X.XX," the general zone (204) returns "YYY.YY.Y.YY," and the fictitious zone (206) returns "ZZZ.Z.Z.Z." Thus, a malicious client using an e-mail based attacked may be directed to a fictitious e-mail server, thereby reducing congestion. It will be apparent to one of ordinary skill in the art that there are many fictitious locations that a fictitious zone may include in a response to a request sent by a malicious clients, regardless of the type of request (e.g., website IP address request, SMTP request, FTP request, etc.).

Figure 3:
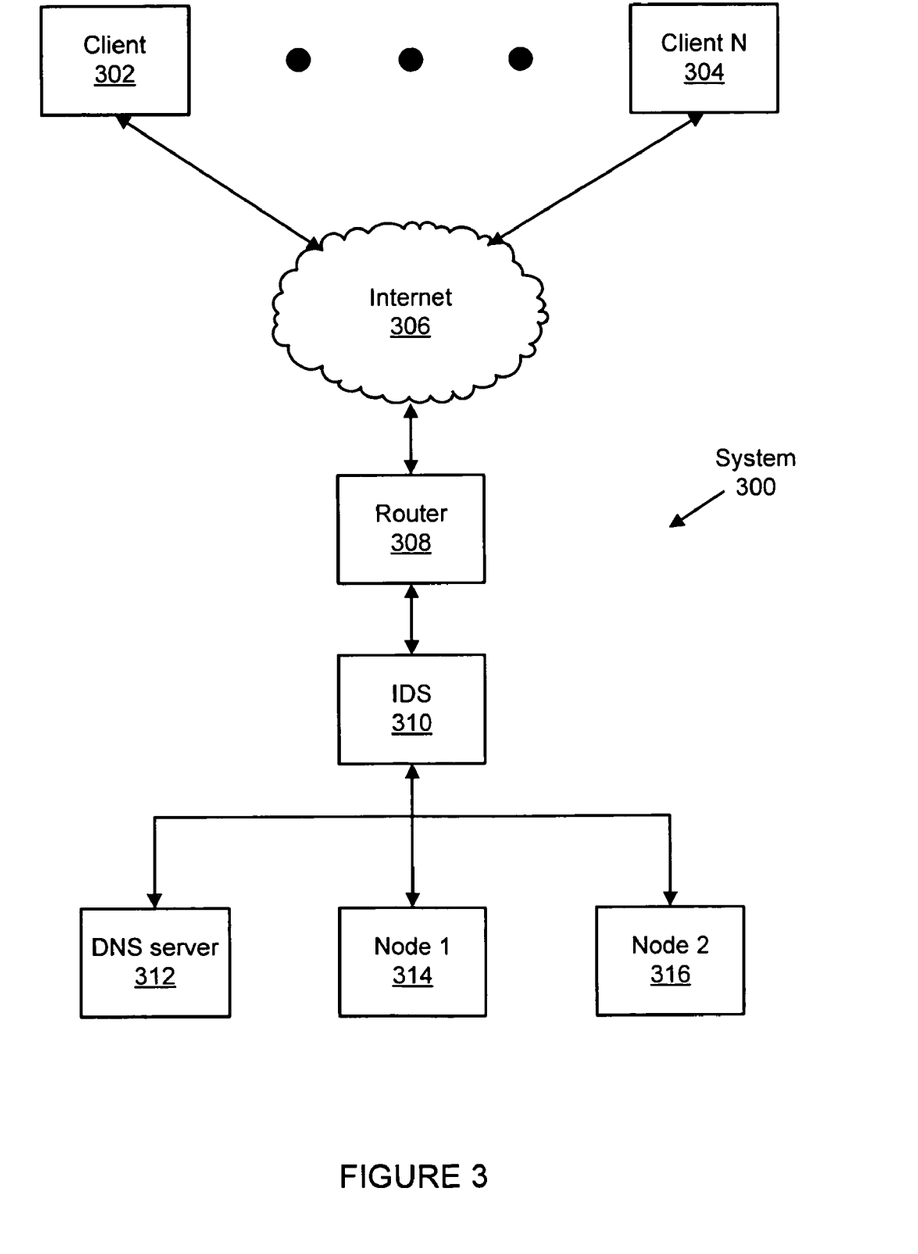
FIG. 3 shows a dataflow diagram of a system in accordance with one or more embodiments of the invention.

FIG. 3 shows a dataflow diagram of a system in accordance with one or more embodiments of the invention. The system of FIG. 3 may be an implementation of the dataflow shown above in FIG. 1. The DNS server (312) of FIG. 3 may be configured similar to the DNS server (200) of FIG. 2. In one or more embodiments of the invention, the system (300) of FIG. 3 contains a client (302), a client N (304), the Internet (306), a router (308), an intrusion detection system (IDS) (310), a DNS server (312), node 1 (314), and node 2 (316). Each of the aforementioned components of FIG. 3 is discussed below.

The client (302) and the client N (304) may be any computing device with a processor and the capability to access a network (e.g., personal computer, smart phone, PDA, gaming device, laptop, etc.), such as the Internet (306). The clients (e.g., client (302) and client N (304)) may use wired and/or wireless connections to access the network. Typically, the clients (e.g., client (302) and client N (304)) send a request through the network to another machine or computing device on the network. For example, the client (e.g., client (302) and client N (304)) may send the request to a DNS server (312) on the network to discover the IP address of a host or service the client (e.g., client (302) and client N (304)) wishes to access.

In one or more embodiments of the invention, the router (308) is a device that controls and directs network traffic, including requests, into and out of the network (not shown) behind the router (308). Before incoming traffic can reach any device on the network behind the router (308), the IDS (310) intercepts and inspects the incoming traffic. The IDS (310) is used to determine whether an attack is being made on a device on the network. Typically, the IDS (310) monitors incoming traffic to identify and/or intercept illegal requests, too many requests originating from the same client, blatant attempts to break through security, and other malicious events. After determining that a client is malicious using one or more of the aforementioned criteria, the IDS (310) may forward that information on to another device in the system, such as the DNS server (312), or may store the information itself. In one or more embodiments of the invention, the IDS (310) may be software based. Alternatively, the IDS (310) may be hardware based.

In one or more embodiments of the invention, the IDS (310) is located on the same device as DNS server (312), or a shared file system between the IDS (310) and the DNS server (312) may be employed. Alternatively, the IDS (310) may be located on a different device than DNS server (312). In one or more embodiments of the invention, the IDS (310) is communicatively coupled to DNS server (312). In one or more embodiments of the invention, the communicative coupling may be accomplished by creating a secure tunnel between the IDS (310) and the DNS server (312).

The DNS server (312), as discussed above, is responsible for directing clients to the specific device that the client is looking for. In one or more embodiments of the invention, DNS server (312) is configured to support split horizon DNS. In one or more embodiments of the invention, the split horizon zones may be created before an attack begins, or may be dynamically created and/or altered during an attack. The DNS server (312) may be in a DMZ (not shown), as shown in FIG. 1. Node 1 (314) and node 2 (316) are devices on the same network (not shown) as the DNS server (312). The devices represented by node 1 (314) and node 2 (316) may be any device capable of accessing or connecting to a network including, but not limited to: printers, personal computers, smart phones, PDA, laptop computers, gaming devices, etc.

Figure 4:
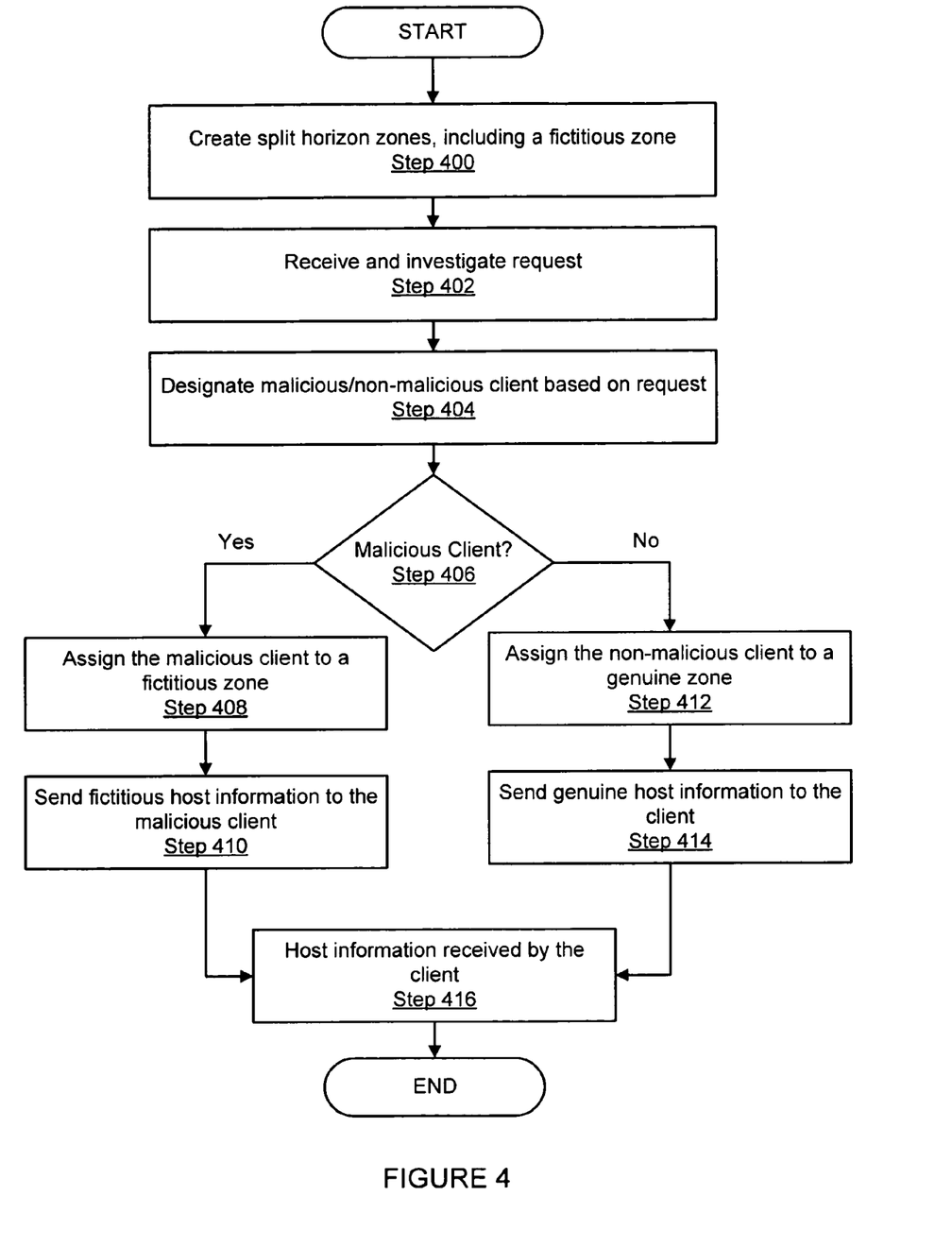
FIG. 4 shows a flowchart of a method in accordance with one or more embodiments of the invention.

FIG. 4 shows a flow chart of a method in accordance with one or more embodiments of the invention. Specifically, FIG. 4 shows a method for congestion recovery during a denial of service attack using split horizon DNS. In one or more embodiments of the invention, one or more of the steps shown in FIG. 4 may be omitted, repeated, and/or performed in a different order than the order shown in FIG. 4. Accordingly, the scope of the invention should not be considered limited to the specific arrangement of steps shown in FIG. 4.

In Step 400, split horizon zones are created, including a fictitious zone, in accordance with one or more embodiments of the invention. In one or more embodiments of the invention, more than one fictitious zone may be created. In one or more embodiments of the invention, the split horizon zones may be created before an attack on the network by a malicious client occurs or, the split horizon zones may be created and/or altered during an attack. It will be apparent to one of ordinary skill in the art that any number of split horizon zones may be created. In one or more embodiments of the invention, the fictitious zone sends malicious clients fictitious IP addresses in response to the malicious client's IP address request(s).

In Step 402, a request is received and investigated, in accordance with one or more embodiments of the invention. The request may be from a client connecting from the local network or from the Internet. The request may be for an IP address of a host. In one or more embodiments of the invention, the request is investigated by an IDS. Investigating the request may include, but is not limited to, determining where the request is from, what the request is, and/or whether the request is legal.

In Step 404, the client generating and sending the request that is investigated is designated as a malicious client or a non-malicious client, in accordance with one or more embodiments of the invention. The designating of malicious clients may be handled by an IDS. Optionally, the designating of malicious clients may be handled by a DNS server. In one or more embodiments of the invention, the IDS designates a client as malicious and then communicates the designation to the DNS server. This communication may be accomplished by running the IDS and the DNS server on the same device, creating a secure tunnel between the IDS and the DNS server, or by using a shared file system between the IDS and DNS server.

In Step 406, a determination is made as to whether the client originating the request is malicious, in accordance with one or more embodiments of the invention. If the client is malicious, the method proceeds to Step 408. If the client is non-malicious, the method proceeds to step 412.

In Step 408, when the client is deemed to be malicious, the malicious client is assigned to a fictitious zone, in accordance with one or more embodiments of the invention. The assignment may be accomplished by assigning the client's IP address to the fictitious zone. Alternatively, if many malicious clients originate from the same network or sub-network, then the IP address of the entire network or sub-network may be assigned to the fictitious zone.

In Step 410, fictitious host information is sent to the malicious client, in accordance with one or more embodiments of the invention. The fictitious host information may be sent by a DNS server. The fictitious host information may be in the form of an incorrect IP address for a device. For example, the malicious client may request the IP address of a website, and the response from the DNS server may be a non-routable address. Alternatively, the response may be the address of the malicious client or the address of a different malicious client. It will be apparent to one of ordinary skill in the art that any response that directs a malicious client to an address outside of the network with the DNS server relieves congestion and be within the scope of the invention.

In Step 412, when the client is not a malicious client, the non-malicious client is assigned to a genuine zone, in accordance with one or more embodiments of the invention. Much like Step 408, the client's IP address is assigned to a genuine zone. A genuine zone may be any zone that is not a fictitious zone, such as a local zone or a general zone, as described in FIG. 2.

In Step 414, genuine host information is sent to the non-malicious client, in accordance with one or more embodiments of the invention. Specifically, the non-malicious client may receive the correct response for the host that the client was seeking in the request. It will be apparent to one of ordinary skill in the art that multiple zones may provide genuine responses.

In Step 416, the host information sent by the DNS server is received by the client and the process ends. If the client is malicious, the client may receive fictitious host information, as described above. If the client is non-malicious, the client may receive genuine host information, as described above. Those skilled in the art will appreciate that the steps outlined in FIG. 4 may be repeated for each request that is received by a router and routed to a DNS server or IDS.

Figure 5A:
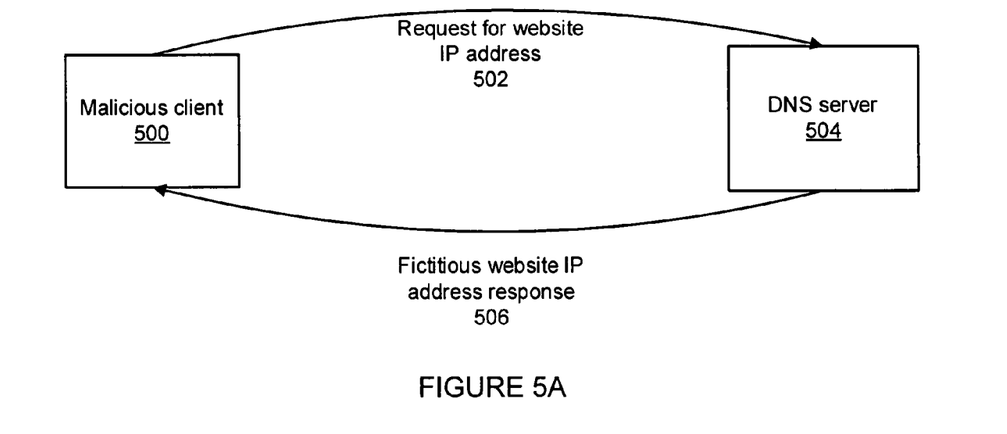
FIGS. 5A-5B show diagrams of an example in accordance with one or more embodiments of the invention.
Figure 5B:
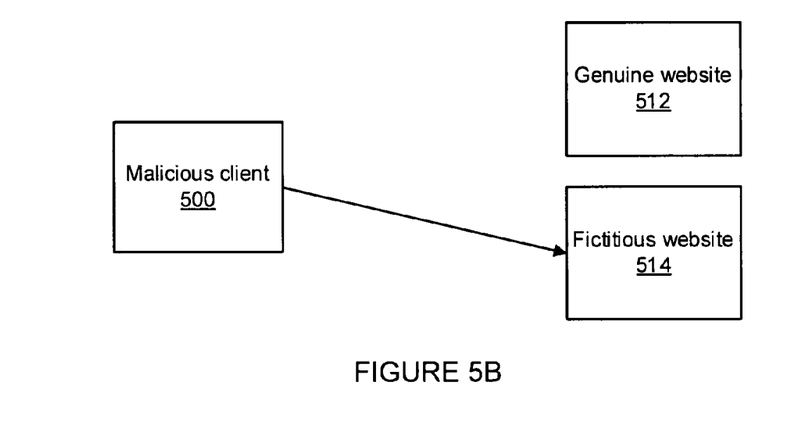

FIGS. 5A-5B show a dataflow diagram of examples in accordance with one or more embodiments of the invention. Specifically, FIGS. 5A-B show examples of a malicious client requesting the IP address of a website, and being directed to a fictitious IP address as a way of relieving congestion during a denial of service attack.

The example begins with FIG. 5A. First, the malicious client (500) requests the IP address of the website (502). For the purposes of this example, the client is already determined to be malicious. The client may be malicious because the client previously attacked the network or is currently attacking the network. In one or more embodiments of the invention, the malicious determination is accomplished by an IDS. In one or more embodiments of the invention, the request (502) is sent to the DNS server (504). Because of the previous designation of the client as malicious, the DNS server (504) recognizes the IP address of the malicious client (500) and assigns the malicious client's IP address to the fictitious zone, in accordance with one or more embodiments of the invention. The DNS server (504) may then respond to the malicious client's (500) request based on the IP address information stored for the fictitious zone. Finally, the client receives this response (not shown), in accordance with one or more embodiments of the invention. The example then proceeds to FIG. 5B.

In FIG. 5B, the malicious client (500) receives the fictitious response from the DNS server (504), in accordance with one or more embodiments of the invention. The malicious client (500) then attempts to access the genuine website (512) based on the IP address received from the DNS server (504). However, because the malicious client (500) is assigned to the fictitious zone, the malicious client (500) receives fictitious information and is directed to the fictitious website (514) instead of the genuine website (512) that the malicious client (500) intended to access.

Figure 6:
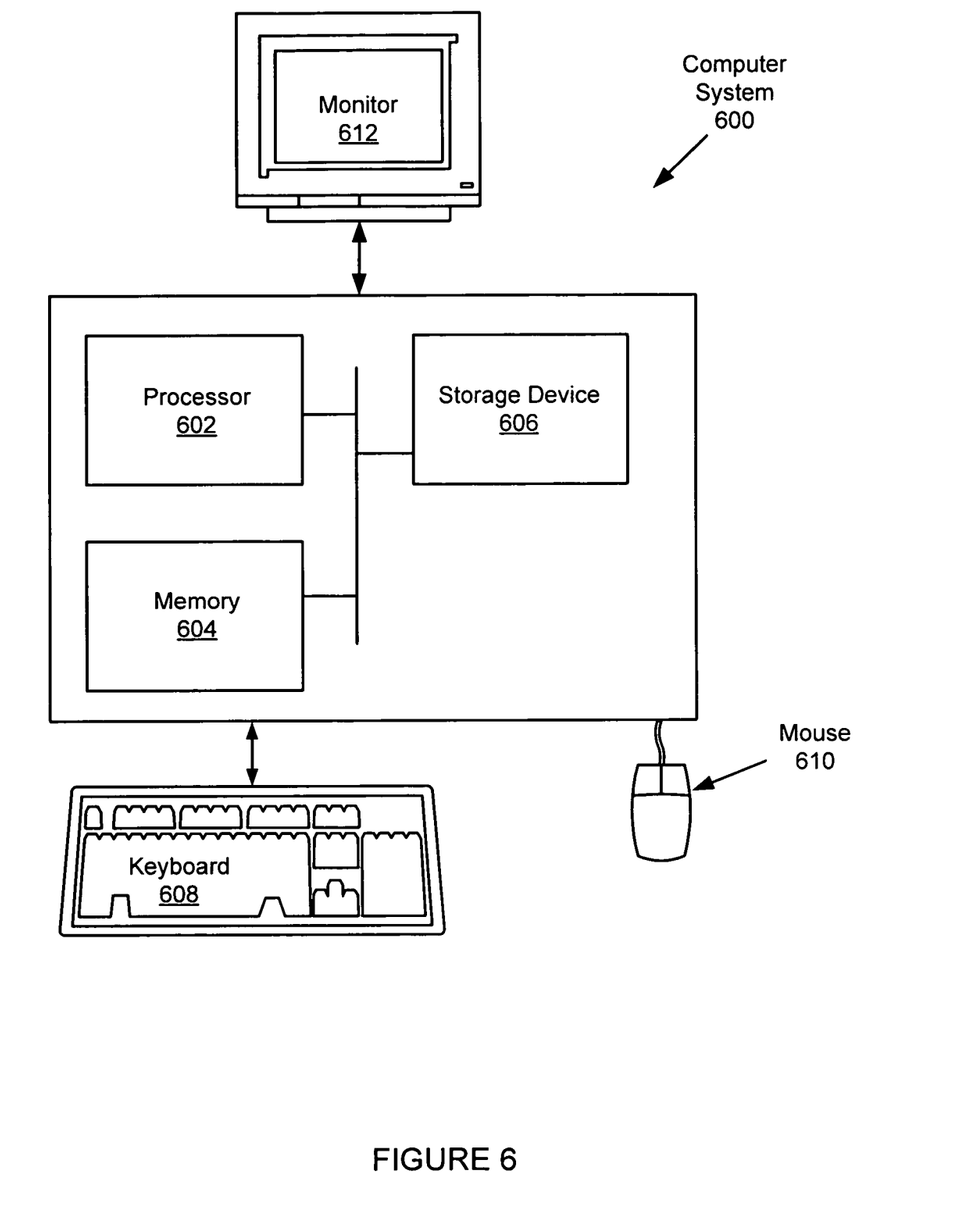
FIG. 6 shows a dataflow diagram of a computer system in accordance with one or more embodiments of the invention.

The invention may be implemented on virtually any type of computing device regardless of the platform being used. For example, as shown in FIG. 6, a computer system (600) includes a processor (602), associated memory (604), a storage device (606), and numerous other elements and functionalities typical of today's computers (not shown). The computer system (600) may also include input means, such as a keyboard (608) and a mouse (610), and output means, such as a monitor (612). The computer system (600) is connected to a local area network (LAN) or a wide area network (e.g., the Internet) (not shown) via a network interface connection (not shown). Those skilled in the art will appreciate that these input and output means may take other forms, now known or later developed.

Further, those skilled in the art will appreciate that one or more elements of the aforementioned computer system (600) may be located at a remote location and connected to the other elements over a network. Further, the invention may be implemented on a distributed system having a plurality of nodes, where each portion of the invention (e.g., DNS sever, IDS, router, zones, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a tangible computer readable medium such as a compact disc (CD), a diskette, a tape, or any other suitable tangible computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for congestion recovery of a local network during a denial of service attack, comprising:

creating a split horizon zone on a hardware server, wherein the split horizon zone comprises a fictitious zone, and wherein the fictitious zone maps Internet Protocol (IP) addresses of a host to an address outside of the local network;
creating a general split horizon zone for non-malicious clients;
receiving and investigating a plurality of requests from a plurality of clients;
designating a malicious client from the plurality of clients based on investigating the plurality of requests, wherein the malicious client is associated with a client address;
assigning the client address to the fictitious zone;
altering the general split horizon zone to further limit malicious client access; and
routing network traffic from the malicious client to the address outside of the local network.

2. The method of claim 1, further comprising:
updating the split horizon zones dynamically.

3. The method of claim 1, wherein designating the malicious client is handled by an Intrusion Detection System (IDS).

4. The method of claim 1, wherein assigning the client address comprises assigning a unique IP address of the malicious client to the fictitious zone.

5. The method of claim 1, wherein assigning the client address comprises assigning an entire sub-network of the malicious client to the fictitious zone.

6. The method of claim 1, wherein the malicious client is sent to the address outside of the local network by rewriting portions of a response sent to the malicious client.

7. The method of claim 1, wherein the address outside of the local network is a non-routable address.

8. The method of claim 1, wherein the address outside of the local network is an address of the malicious client.

9. A system for denial of service attack congestion recovery of a local network, comprising:

a plurality of clients with a processor comprising functionality to execute software instructions for sending a plurality of requests, wherein the plurality of requests comprise requests for a plurality of Internet Protocol (IP) addresses;
a domain name system (DNS) server comprising a processor, and communicatively coupled to the plurality of clients and configured for:
creating a split horizon zone, wherein the split horizon zone comprises a fictitious zone, and wherein the fictitious zone maps IP addresses of a host to an address outside of the local network,
creating a general split horizon zone for non-malicious clients;
receiving and investigating a plurality of requests from the plurality of clients,
designating a malicious client from the plurality of clients based on investigating the plurality of requests, wherein the malicious client is associated with a client address,
assigning the client address to the fictitious zone,
altering the general split horizon zone to further limit malicious client access; and
routing network traffic from the malicious client to the address outside of the local network;
an intrusion detection system (IDS) communicatively coupled to the plurality of clients and the DNS server.

10. The system of claim 9, wherein the DNS server and the IDS reside on the same machine.

11. A non-transitory computer readable medium storing instructions for congestion recovery during a denial of service attack, the instructions comprising functionality to:
- create a split horizon zone on a server, wherein the split horizon zone comprises a fictitious zone, and wherein the fictitious zone maps Internet Protocol (IP) addresses of a host to an address outside of the local network;
- create a general split horizon zone for non-malicious clients;
- receive and investigate a plurality of requests from a plurality of clients; designate a malicious client from the plurality of clients based on investigating the plurality of requests;
- assign the address of the malicious client to the fictitious zone;
- alter the general split horizon zone to further limit malicious client access; and
- route network traffic from the malicious client to the address outside of the local network.

12. The non-transitory computer readable medium of claim 11, further comprising instructions comprising functionality to:
- update the split horizon zones dynamically.

13. The non-transitory computer readable medium of claim 11, wherein designating the malicious client is handled by an Intrusion Detection System (IDS).

14. The non-transitory computer readable medium of claim 11, wherein assigning the client address comprises assigning a unique IP address of the malicious client to the fictitious zone.

15. The non-transitory computer readable medium of claim 11, wherein assigning the client address comprises assigning an entire sub-network of the malicious client to the fictitious zone.

16. The non-transitory computer readable medium of claim 11, wherein the malicious client is sent to the address outside of the local network by rewriting portions of a response sent to the malicious client.

17. The non-transitory computer readable medium of claim 11, wherein the address outside of the local network is a non-routable address.

18. The non-transitory computer readable medium of claim 11, wherein the address outside of the local network is the address of the malicious client.

* * * * *